United States Patent
Roy et al.

(10) Patent No.: US 10,863,404 B2
(45) Date of Patent: Dec. 8, 2020

(54) SATELLITE LOAD BALANCING

(71) Applicant: Hughes Network Systems, LLC, Germantown, MD (US)

(72) Inventors: Satyajit Roy, Gaithersburg, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/196,265

(22) Filed: Nov. 20, 2018

(65) Prior Publication Data
US 2020/0162985 A1 May 21, 2020

(51) Int. Cl.
*H04W 36/22* (2009.01)
*H04W 36/08* (2009.01)
*H04W 84/06* (2009.01)

(52) U.S. Cl.
CPC .......... *H04W 36/22* (2013.01); *H04W 36/08* (2013.01); *H04W 84/06* (2013.01)

(58) Field of Classification Search
CPC .............................. H04W 36/22; H04W 36/08
See application file for complete search history.

(56) References Cited

U.S. PATENT DOCUMENTS

| 2002/0065078 | A1* | 5/2002 | Cohen | H04B 7/18582 455/427 |
| 2007/0038748 | A1* | 2/2007 | Masuyama | G06F 3/0613 709/225 |
| 2011/0116443 | A1* | 5/2011 | Yu | H04L 12/413 370/328 |
| 2011/0255463 | A1* | 10/2011 | Roos | H04B 7/18528 370/316 |
| 2017/0105153 | A1 | 4/2017 | Ashrafi et al. | |

FOREIGN PATENT DOCUMENTS

| WO | 99/10994 A1 | 3/1999 |
| WO | 2018/142618 A1 | 8/2018 |

OTHER PUBLICATIONS

International Search Report and Written Opinion for PCT/US2019/062096 dated Feb. 14, 2020 (11 pages).
Daigo Kudoh et al: "Dynamic Load Balancing Method Based on Congestion Prediction for IP/LEO Satellite Networks", IEICE Transactions on Communications, Communication Society, Tokyo, JP, vol. E92B, No. 11, Nov. 1, 2009, pp. 3326-3334, XP001550908, ISSN: 0916-8516, DOI: 10.1587/Transcom.E92.B.3326 paragraph [0003].

\* cited by examiner

*Primary Examiner* — Stephen J Clawson
(74) *Attorney, Agent, or Firm* — Bejin Bieneman PLC

(57) ABSTRACT

A system includes a computer that is programmed to actuate to switch from a first satellite link between a terminal and a first satellite to a second satellite link upon determining that a data throughput of the first satellite relative to a first satellite throughput capacity exceeds a threshold.

18 Claims, 7 Drawing Sheets

SATELLITE LOAD BALANCING

BACKGROUND

Satellite communication is utilized as a wireless communication technology, e.g., for Internet access, enterprise intranet connectivity, TV (television) broadcasting services, etc. Coverage areas of satellites on the earth surface may overlap. For example, as newer satellite communication technologies are introduced, and new satellites are launched in the earth orbit, previously operation satellites may be kept in service, and may have substantial overlap in covered areas.

DETAILED DESCRIPTION

Introduction

Figure 1:
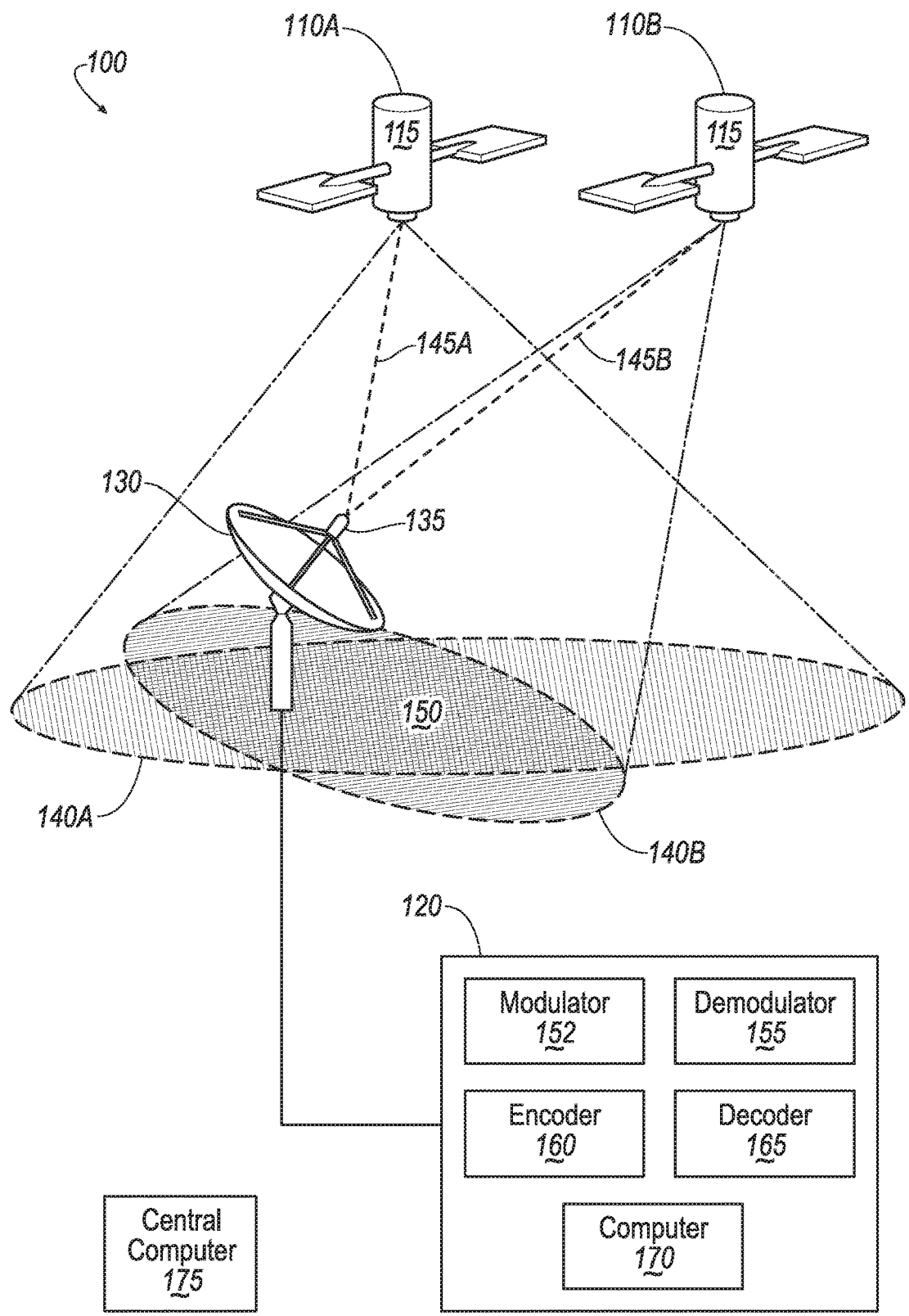
FIG. 1 illustrates an example satellite network.

Disclosed herein is a system including a computer that is programmed to actuate to switch from a first satellite link between a terminal and a first satellite to a second satellite link upon determining that a data throughput of the first satellite relative to a first satellite throughput capacity exceeds a threshold.

The first satellite link may be between the terminal and the first satellite and the second satellite link may be between the terminal and a second satellite.

The computer may be further programmed to select the second satellite link based at least on one of a coverage area, a link condition, and a jitter, of the second satellite link.

The computer may be further programmed to select the second satellite link further based in part on an average data throughput of satellites that are within a field of view of a terminal antenna.

The computer may be further programmed to switch to the second satellite link only upon determining that a data type quantifier of data being communicated via the first satellite link exceeds a data type quantifier threshold.

The system may further include an advanced phased array antenna and the computer may be further programmed to activate the second satellite link while maintaining a communication via the first satellite link upon determining that a data throughput of the first satellite exceeds a threshold.

The system may further include a remote computer that is programmed to select the second satellite link for the terminal and to actuate the terminal to switch to the second satellite link.

The remote computer may be further programmed to receive a location and data throughput of the terminal, to identify satellites with an area of overlap including the location of the terminal, to determine data throughput of each of the identified satellites, to determine an average data throughput of the identified satellites, and to determine the second satellite link based at least in part on the data throughput of each of the identified satellites, the average data throughput of satellites, and the data throughput of the terminal.

The remote computer may be further programmed to transmit a command to the terminal to switch to the second satellite link, and the computer may be further programmed to switch to the second satellite link upon receiving the command from the remote computer.

The system may further include an antenna and the computer may be further programmed to receive broadcast data including an average data throughput of satellites that are within a field of view of the antenna, to determine the second satellite link based on the received broadcast data and the data throughput of the first satellite, and to actuate to switch to the second satellite link.

The first and second satellite links may be to a same satellite and differ in at least one of a spot beam, polarization, a symbol rate, and a frequency.

Further disclosed herein is a method including actuating a terminal to switch from a first satellite link between a terminal and a first satellite to a second satellite link upon determining that a data throughput of the first satellite relative to a first satellite throughput capacity exceeds a threshold.

The first satellite link may be to a first satellite and the second satellite link is to a second satellite.

The method may further include selecting the second satellite link based at least on one of a coverage area, a link condition, and a jitter, of the second satellite link.

The method may further include selecting the second satellite link based in part on an average data throughput of satellites that are within a field of view of an antenna.

The method may further include switching to the second satellite link only upon determining that a data type quantifier of data being communicated via the first satellite link exceeds a data type quantifier threshold.

The method may further include activating, in an advanced phased array antenna, the second satellite link while maintaining a communication via the first satellite link upon determining that a data throughput of the first satellite exceeds a threshold.

The method may further include selecting, in a remote computer, the second satellite link for the terminal and actuating the terminal to switch to the second satellite link.

The method may further include receiving, in the remote computer, a location and data throughput of the first satellite, identifying satellites with an area of overlap including the location of the terminal, determining data throughput of each of the identified satellites, determining an average data throughput of the identified satellites, and determining the second satellite link based at least in part on the data throughput of each of the identified satellites, the average data throughput of satellites, and the data throughput of the terminal.

The method may further include receiving, from a remote computer, broadcast data including an average data throughput of satellites that are within a field of view of a terminal antenna, determining, in the terminal, the second satellite link based on the received broadcast data and the data throughput of the terminal, and actuating to switch to the second satellite link.

Further disclosed is a computing device programmed to execute the any of the above method steps.

Yet further disclosed is a computer program product comprising a computer readable medium storing instructions executable by a computer processor, to execute the any of the above method steps.

Exemplary System Elements

As disclosed herein, in an overlapping area of satellite coverages, terminals may communicate with at least one of multiple satellites. A dynamic load balancing scheme is disclosed such that data throughput is balanced between various satellites. This may prevent, e.g., data congestion on a first satellite while bandwidth of a second satellite covering some or all of a same area covered by the first satellite is insufficiently utilized. In the present context, data throughput of a satellite is a volume of data communicated (transmitting and receiving) by a satellite based on time, e.g., specified in Gigabit per second (Gbit/s), Mega symbols per second (Msps), or any other applicable unit.

In order to balance respective data loads of two or more satellites, a computer may actuate a terminal to switch from a first satellite link to a second satellite link upon determining that data throughput of the first satellite relative to a first satellite throughput capacity exceeds a threshold. In one example, a central computer manages load balancing of a system including multiple satellites and multiple terminals. In another example, each terminal in a satellite network may determine whether to switch to another satellite, e.g., based on an internal logic and/or statistic describing a current data throughput of one or more satellites.

Further, a terminal may switch from a first to a second satellite link in a variety of ways. In one example, a terminal may switch from a first satellite link to a second satellite link by deactivating the first satellite link and activating the second satellite link. In another example, a terminal may activate communication via a second satellite link while maintaining communication via the first satellite link. Further, examples of switching from a first satellite link to a second satellite link is disclosed, in which the first and second satellite links provide communication via different beams (or spot beams) of a same satellite.

As illustrated in FIG. 1, a satellite network 100 (or communication network 100) includes one or more computing devices, such as may be included in satellites 110A, 110B, terminal(s) 120, dish(s) 130, antenna(s) 135, gateway (s) (not shown), and/or a remote computer 175. Although the example satellite network 100 of FIG. 1 shows two satellites 110A, 110B, the satellite network 100 may include any number of satellites 110, e.g., 3 or more. For example, each of satellites 110A, 110B can include a computer 115; each terminal 120 can have a computer 170. A computer, as that term is used herein, refers to a machine including a processor and memory. A computer memory can be implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processors in computers 115, 170 may be programmed to execute instructions stored in the memory to carry out the actions of the satellites 110A, 110B, terminals 120, and gateways, as discussed herein.

The satellites 110A, 110B collectively form a constellation (i.e., a group) of network nodes whose position may change relative to one another, to the ground, or both. The satellites 110A, 110B include various circuits, chips, or other electronic components. Satellites 110A, 110B may be in low Earth orbit (LEO) in multiple planes and orbits relative to one another. Examples of orbits may include a polar orbit, a geosynchronous orbit, or an inclined orbit. Because the satellites 110A, 110B are moving relative to the ground, the downlink and uplink beams served by each respective satellite 110A, 110B changes over time. Moreover, because the satellites 110A, 110B can move relative to one another, neighboring satellites 110A, 110B may also change over time. Thus, the other satellites 110A, 110B available for direct communication may change as one or more of the satellites 110A, 110B moves.

The terminals 120, e.g., very small aperture terminals (VSAT), are computer-based communication devices implemented via circuits, chips, antennas, or other electronic components that can communicate with satellites 110A, 110B that are within communication range of the terminal 120. In some instances, the terminals 120 are stationary relative to a location on Earth. In other instances, the terminals 120 are mobile, meaning that the terminals 120 move relative to a location on the Earth. In some instances, the terminal 120 may provide an interface between a satellite 110A, 110B and other ground-based communication devices. For instance, the terminal 120 may receive communications from a satellite 110A, 110B and transmit such communications via terrestrial-based communication channels. Likewise, the terminals 120 may receive communications via a terrestrial-based communication channel and transmit the communication to a satellite 110A, 110B.

The terminal 120 may include a modulator 152 and a demodulator 155 to facilitate communications with satellites 110A, 110B. Moreover, each terminal 120 may have an encoder 160 to encode outgoing data and/or a decoder 165 to decode received data. Each terminal 120 may include or be communicatively connected to one or more dish(s) 130 and antenna(s) 135, which allow a terminal 120 to communicate with one or more satellites 110A, 110B at a time.

The antenna 135 may include a low-noise block downconverter (LNB) mounted on a dish 130, which may collect radio waves from the dish 130 and convert the collected radio waves to a signal which is sent through wired connection, e.g., a cable, to the terminal 120. The antenna 135 may be a combination of low-noise amplifier, frequency mixer, local oscillator and intermediate frequency (IF) amplifier. The antenna 135 serves as a radio frequency (RF) front end of a terminal 120, receiving a microwave signal from a satellite 110A, 110B collected by the dish 130, amplifying the received signal, and converting the block of frequencies to a lower block of intermediate frequencies (IF). This conversion of RF to a lower block of IF-, allows the signal to be carried, e.g., via a wired connection, to a terminal 120. An antenna 135 typically includes a sender antenna configured to send radio waves to a satellite 110A, 110B, and/or a receiver antenna configured to receive radio waves from a satellite 110A, 110B.

Each satellite 110A, 110B has a coverage area 140A, 140B. In the present context, a coverage area 140A, 140B of a satellite 110A, 110B is a geographical area on the surface of Earth, in which a terminal 120A may communicate with the respective satellite 110A, 110B. In addition to a location of a terminal 120, other parameters such as weather conditions, objects such as buildings, trees, etc., may partially or fully impair communication of a terminal 120 with a satellite 110A, 110B within a respective coverage area 140A, 140B. A shape, dimensions, etc., of a coverage area 140A, 140B may depend on multiple parameters such as a distance of the satellite 110A, 110B from the Earth, a width of an electromagnetic beam of the satellite, etc. For example, a wide beam of a satellite 110A, 110B may produce a coverage area 140A, 140B including a large area, e.g., a country, whereas a narrow beam may produce a coverage area 140A, 140B including a metropolitan area.

Based on a shape, dimensions, etc., of coverage areas 140A, 140B, the coverage areas 140A, 140B may overlap resulting in an area of overlap 150, as shown in FIG. 1. Alternatively, a coverage area 140 of any number, e.g., 3 or more, of satellites 110 may overlap in an area of overlap 150. Each satellite 110A, 110B may have any number (one or more) of beams that cover different coverage areas 140 and/or have one or more areas of overlap 150. A terminal 120 antenna 135 may be able to communicate with multiple satellites 110A, 110B, e.g., one at a time or simultaneously, when the antenna 135 is located within an area of overlap 150. In the present context, the area of overlap 150, referred to sometimes as overlap 150, may be result from overlapping areas 140A, 140B of beams of a single satellite 110A, 110B. For example, two or more beams with different polarization, frequency, and/or symbol rate, from a same satellite 110A, 110B may overlap. In the present context, symbol rate (also baud rate or modulation rate) is a number of symbol changes, waveform changes, or signaling events, across a transmission medium per time unit using a digitally modulated signal or a line code.

With reference to FIG. 1, a terminal 120 computer 170 and/or a remote computer 175 can be programmed to actuate, e.g., a terminal 120 antenna 135, to switch from a first satellite link 145A to a second satellite link 145B upon determining that a data throughput of the first satellite 110A relative to a first satellite throughput capacity exceeds a threshold. In the present context, a data throughput of a satellite 110A, 110B relative a satellite 110A, 110B throughput capacity may be also referred to as a normalized data throughput $d_i$, e.g., specified as a unitless numeric value such as a percentage. A satellite 110A, 110B throughput capacity may be specified in a unit such as Gbit/s.

As shown in the example communication network 100 of FIG. 1, the first satellite link 145A may be to a first satellite 110A and the second satellite link 145B may be to a second satellite 110B. In another example (not shown), the first and second satellite links 145A, 145B may be from the terminal 120 to a same satellite, e.g., the satellite 110A. Thus, the satellite links 145A, 145B may differ in a communication frequency, symbol rate, polarization, etc.

In the present context, a satellite link 145A, 145B is a wireless communication between a terminal 120 antenna 135 and a satellite 110A, 110B antenna. A satellite link 145A, 145B is typically established upon adjusting (or configuring) a terminal 120 modulator 152, demodulator 155, encoder 160, and/or decoder 165 of a terminal to communicate with a satellite 110A, 110B.

In the present context, a satellite link 145A, 145B may include an uplink, including communication from the terminal 120 to a satellite 110A, gateway, etc. and a downlink, which includes communication from the satellite 110A, 110B to the terminal 120. A direction of data transmission from a terminal 120 via an uplink to the satellite is referred to in the present context as "in-route," whereas a direction of data transmission from a gateway, satellite 110A, 110B, etc. to a terminal 120 via a downlink is referred herein to as "out-route." In the present context, a satellite link 145A, 145B may include one or more in-route and/or out-routes, with data throughput and threshold evaluation (as discussed below) applicable to a single out-route or multiple out-routes.

In the present context, to "actuate to switch from a first satellite link 145A to a second satellite link 145B" means to (i) deactivate the first satellite link 145A and activate the second satellite link 145, or (ii) activating the second satellite link 145B while maintaining the first satellite link 145A. In the present context, "activating" or "deactivating" a satellite link 145A, 145B may include configuring one or more terminal 120 components such as antenna 135, a modulator 152, demodulator 155, encoder 160, and/or decoder 165 to communicate or disable an existing communication via the respective satellite link 145A, 145B, e.g., communicating based on a specified frequency, polarization, symbol rate specific to the satellite link 145A, 145B. Thus, in the present context, switching from a first satellite link 145A to a second satellite link 145B is performed electronically, i.e., without any physical change to an orientation of the dish 130 and/or the antenna 135 (e.g., by actuating a phased array antenna 135, as discussed below).

A terminal 120 may have a limited capability of switching between different satellite links 145A, 145B. With respect to configurations of terminals 120 to switch between different satellite links 145A, 145B, a terminal 120 may be (i) a non-diverse, (ii) a semi-diverse, or a fully-diverse.

A fully-diverse terminal 120 in an overlap 150 is able to switch between satellites 110A, 110B covering the overlap 150. A semi-diverse terminal 120 is limited to switching between specific satellites 110A, 110B, rather than each satellite 110A, 110B that covers the overlap 150. A non-diverse terminal 120 is not be capable of switching between satellites 110A, 110B and/or satellite links 145A, 145B of a same satellite 110A, 110B. Thus, a non-diverse terminal 120 communicates at all times via a same satellite 110A, 110B for which it is configured at a time of installation.

A terminal 120 computer 170 and/or central computer 175 may be programmed to switch a semi-diverse or fully-diverse terminal 120 from a first satellite link 145A to a second satellite link 145B. For example, the computer 170, 175 may be programmed to switch a semi-diverse terminal 120 from a first satellite link 145A to a second satellite link 145B only upon determining that the semi-diverse terminal 120 can communicate via the second satellite link 145B (i.e., the second satellite link 145B is a link to a satellite 110A, 110B from the satellites 110A, 110B that is accessible for the semi-diverse terminal 120.

In this disclosure, a determination to switch satellite links 145A, 145B of a terminal 120 made in the central computer 175 is referred to as "centrally-controlled;" a determination made in terminal(s) 120 computer(s) 170 is referred to as "distributed-control."

In order to switch between satellite links 145A, 145B, a satellite 110A, 110B is typically within an antenna 135 operating view (or field of view). An operating view of an antenna 135, in the present context, means a portion of the sky that is visible to the antenna 135 based on the antenna 135 radio magnetic pattern and/or a dish 130 design, e.g., shape, dimensions, etc. The antenna 135, e.g., a phased array antenna 135, may be configured to receive a beam from a satellite 110A, 110B at a location within the antenna 135 operating view, and/or to transmit a beam to a satellite 110A, 110B at a location in the antenna 135 operating view.

As discussed above, switching to a second satellite link 145A may include maintaining the first satellite link 145A. In one example, a phased array antenna 135 may be configured to activate a second satellite link 145B while maintaining a first satellite link 145A. In the present context, a simple phased array antenna 135 means a phased array antenna 135 that may communicate via one satellite link 145A, 145B at a time, whereas an advanced phased array antenna 135 means a phased array antenna 135 that is configured to receive beams from multiple satellites 110A, 110B at a same time (or simultaneously), and/or transmit beams to at least one satellite 110A, 110B at the same time.

To switch from a first satellite link 145A to a second satellite link 145B, as discussed below, the computer 170, 175 may be programmed to determine (i) whether to switch to a second satellite link 145B, (ii) to which satellite link 145B to switch, and/or (iii) whether to maintain the first satellite link 145A (i.e., in the case of an advanced phased array antenna 135).

The computer 170, 175 may be programmed to switch from a first satellite link 145A to a second satellite link 145B based on a data throughput threshold. With reference to equation (1) given below, the computer 170, 175 may be programmed to switch from the first satellite link 145A of the satellite 110A to a second satellite link 145B of the satellite 110B upon determining that a difference of normalized data throughput $d_a$ of the satellite 110A (e.g., data throughput as a percentage of satellite 110A, 110B throughput capacity) relative to an average data throughput $d_{avg}$ of satellites 110A, 110B covering the overlap 150 exceeds a data throughput threshold $d_t$, e.g., 1 Gigabit per second (Gbit/s). Thus, an average data throughput davg may be translated to a different amount of data throughput, e.g., in Gbit/s, for each satellite 110A, 110B depending on a throughput capacity of the respective satellite 110A, 110B.

Additionally or alternatively, the normalized data throughput $d_a$ of a satellite 110A may be determined based on current, average, predicted, and/or a combination of current and predicted, data throughput. For example, by determining the normalized data throughput $d_a$ based on a combination of current, average (e.g., over a specified time duration such as an hour), and/or a predicted value, a transitory effect of short term switching of satellite links 145A, 145B may be prevented. A predicted normalized data throughput $d_a$ may be determined based on historic records of data throughput, time of day, etc.

Additionally or alternatively, a satellite 110A, 110B may have multiple beams, e.g., with different polarizations, frequencies, etc., covering the area of overlap 150, and a normalized data throughput $d_a$ of a satellite 110A, 110B may be determined for each of the beams of a satellite 110A, 110B. Thus, the computer 170, 175 may switch from a first link 145A on a first beam of the satellite 110A to a second satellite link 145B on a second beam of the same satellite 110A to balance the load among different beams of the satellite 110A covering a location of the terminal 120. For example, the computer 170 may be programmed to determine a first data throughput $d_{a1}$ for a first beam of the first satellite 110A and a second data throughput $d_{a2}$ for a second beam of the first satellite 110A, and to actuate the terminal 120 to switch from the first link 145A on the first beam to a second link 145B on the second beam upon determining that (i) a difference of the first data throughput $d_{a1}$ relative to the average data throughput $d_{avg}$ exceeds the threshold $d_t$, and/or (ii) the difference of the second data throughput $d_{a2}$ relative to the average data throughput $d_{avg}$ is less than the threshold $d_t$.

$$d_a - d_{avg} > d_t \quad (1)$$

Thus, upon switching from the first satellite link 145A to the second satellite link 145B, a normalized data throughput $d_a$ of the satellite 110A that has a data throughput greater than average data throughput $d_{avg}$ may be reduced. In an example, an average data throughput $d_{avg}$ may be determined based on equation (2) below. For example, the computer 170, 175 may be programmed to identify the data throughput $d_i$ of n satellites 110A, 110B that cover the overlap 150, and to determine the average data throughput $d_{avg}$ of satellites 110A, 110B based on equation (2).

$$d_{avg} = \frac{1}{n} \cdot \sum_{i=1}^{n} d_i \quad (2)$$

Additionally or alternatively, an average data throughput $d_{avg}$ may be determined for each satellite 11A, 110B based on the respective satellite 11A, 110B normalized data throughputs $d_i$, i.e., based in part on satellites 110A, 110B throughput capacity, e.g., 5 Gbit/s. Different satellites 110A, 110B may have different throughput capacities. Thus, a throughput amount may exhaust 10% of capacity of a satellite 110A, but 90% of a capacity of a second satellite 110B. In one example, with reference to equation (2), each data throughput $d_i$ may be determined as a percentage of a data throughput capacity of the respective satellite 110A, 110B that is currently being used.

The computer 170, 175 may be programmed to switch from the first satellite link 145A to a second satellite link 145B upon determining that a link condition $lc_b$ of the second satellite link 145B relative to the link condition $lc_a$ of the first satellite link 145A exceeds a link condition threshold $lc_{th}$. In the present context, a "link condition" is a parameter that quantifies one or a combination of one or more measures of link 145A, 145B quality, typically including one or more of packet loss, latency, congestion, and/or jitter. For example, a link condition may be specified in a range of 1 (poor condition) to 10 (excellent condition). The computer 170, 175 may be programmed, based on equation (3), to switch to a second satellite link 145B upon determining that an improvement of link condition (i.e., a difference $lc_b - lc_a$) exceeds a link condition threshold $lc_{th}$, e.g., 2.

$$lc_b - lc_a > lc_{th} \quad (3)$$

In another example, the computer 170, 175 may be programmed to determine a link condition $lc_a$, $lc_b$ further based on environmental conditions such as (i) objects, e.g., trees, which may block a view of the terminal 120, (ii) a weather condition, e.g., inclement weather system impairing a second satellite link, etc.

Switching from a first satellite link 145A to a second satellite link 145B may cause a temporary interruption (or interrupt) of data communication, e.g., a loss of a number of data packets, a jitter, a delay in transmitting data scheduled to transmit at a time of switching the links 145A, 145B, etc. Specific data types such as voice-over-IP (VOIP) may be sensitive to such interruption resulted from switching satellite links 145A, 145B. The computer 170, 175 may be programmed to detect a type of data communicated via the satellite link 145A, e.g., using deep packet inspection, packet header classification, or other traffic classification techniques, and to determine whether to switch to a second satellite link 145B further based on the detected type of data. Table 1 shows example types of data that may be identified based on such classification techniques. The computer 170, 175 may be programmed to determine a data type quantifier $DT_Q$ based on the type of data. In one example, the computer 170, 175 may be programmed to allow a switching to a second satellite link 145B upon determining that a data type quantifier $DT_Q$ of data being communicated via the first satellite link 145A is beyond a data type quantifier threshold, e.g., 0 (zero). With reference to Table 1, in the present context, "beyond" means greater. However, depending on a definition of the $DT_Q$, "beyond" a threshold could mean "less than" the threshold.

TABLE 1

| Type | Description | $DT_Q$ |
|---|---|---|
| High priority | An interrupt causes loss of data, e.g., VOIP | −1 |
| Normal | An interrupt may result in delay but no loss of data | 0 (zero) |
| Low priority | An interrupt may not result in any problem | 1 |

In one example, with reference to Table 1 and equation (3), the switching quantifier Q may be reduced upon detecting a VOIP communication via the satellite link 145A due to a negative value (−1) of $DT_Q$; thus, switching to a second satellite link 145B becomes less likely. Additionally or alternatively, the data type quantifier $DT_Q$ may be specified based other ranges, tables, formulas, etc., depending on results of traffic classification. Additionally, the data type quantifier $DT_Q$ may be specified based on multiple data flows communicated via a satellite link 145A simultaneously. In one example, the computer 170, 175 may be programmed to determine a data type quantifier $DT_Q$ for each of the data flows, and to determine the data type quantifier $DT_Q$ for the satellite link 145A based on a maximum priority of the determined data type quantifiers $DT_Q$ of the data flows. In another example, the computer 170, 175 may be programmed to determine the data type quantifiers $DT_Q$ of the satellite link 145A to be a mean (average) of the determined data type quantifiers $DT_Q$ of the data flows of the respective satellite link 145A.

A computer 170, 175 may be programmed to switch from a first satellite link 145A to a second satellite link 145B based on a combination of data throughput, link condition, and/or data type. For example, the computer 170, 175 may be programmed, based on the equation (4), to switch to a second satellite link 145B upon determining that a switching quantifier Q, which is based on factors including throughput deviation, link condition difference, data type, etc., exceeds a threshold Qth. The weights $w_1$, $w_2$, $w_3$ may be adjusted based on a significance of each of the inputs. In one example, the weights $w_1$, $w_2$, $w_3$ may be 0.3, 0.6, 0.2. Thus, a determination to switch to a second satellite link 145B may be based more on data throughput rather than link condition or data type. Alternatively, the weights $w_1$, $w_2$, $w_3$ may be equal.

$$Q = w_1 \cdot \frac{lc_b - lc_a}{lc_a} + w_2 \frac{d_a - d_{avg}}{d_{avg}} + w_3 \cdot DT_Q > th \quad (4)$$

As discussed above, switching of satellite links 145A, 145B may be centrally-controlled, e.g., by the remote computer 175, or distributed-controlled, e.g., by a terminal 120 computer 170. In a centrally-controlled communication network 100, the remote computer 175 may be programmed to determine a second satellite link 145B for a terminal 120 and to switch the terminal 120 to the second satellite link 145B. In one example, the computer 175 may deactivate the first satellite link 145B and activate the second satellite link 145B. In another example, the computer 175 may determine that the terminal 120 includes an advanced phased array antenna 135 and may actuate the terminal 120 to activate a second satellite link 145B while maintaining the first satellite link 145A, thereby minimizing traffic interruption resulting from switching satellite links 145A, 145B.

In a centrally-controlled communication network 100, the remote computer 175 may determine data throughput $d_i$ of each of the satellites 110A, 110B, data throughputs $d_a$, $d_b$ of each of satellite links 145A, 145B, and, e.g., based on equation (4), actuate a terminal 120 to switch from a first satellite link 145A to a second satellite link 145B. The computer 175 may be programmed to identify the second satellite link 145B to a second satellite 110B at least based on a location of the terminal 120 on earth, a coverage area 140B of the second satellite 110B, data throughput $d_i$ of the second satellite 110B, etc. In one example, the computer 175 may select a second satellite link 145B to a satellite 110B based on a data throughput $d_i$ (with respect to in-route and/or out-route data throughput) of the second satellite 110B. For example, the computer 175 may identify a second satellite 110B among satellites 110A, 110B in the field of view of the terminal 120 dish 130 that has a minimum data throughput $d_i$. Thus, the computer 175 may transfer load of the terminal 120 to the satellite 110B with a lowest data throughput $d_i$. Additionally or alternatively, the computer 175 may implement other techniques to balance the load of terminals 120 among the satellites 110A, 110B. In the present context, "balancing" or "to balance" means distributing the load (in-route and/or out-route) of terminals 120 as uniformly as possible among satellites 110A, 110B, relative to capacities of the respective satellites 110A, 110B.

Upon determining the second satellite link 145B, the remote computer 175 may be programmed to transmit a command (or "command data") to the terminal 120 including (i) an identifier of the terminal 120, (ii) an identifier of the satellite 110B, (iii) a beam identifier for the second satellite link 145B, and/or an out-route and/or in-route identifier for the second satellite link 145B. A satellite 110A, 110B may radiate multiple beams and each beam may be identified by an identifier. The terminal 120 computer 170 may receive the command data, and, upon determining that the received command data includes the identifier of the terminal 120, may actuate one or more terminal 120 components to switch to the second satellite link 145B based on the received data in the command data, e.g., the second satellite 110B identifier, beam identifier, etc.

As discussed above, a terminal 120 may be semi-diverse, non-diverse, or fully-diverse. The computer 175 may be programmed to determine the command to switch a terminal 120 upon determining that the terminal 120 is a semi-diverse or a fully-diverse terminal 120. A non-diverse terminal 120 cannot switch to a second satellite link 145B. Therefore, the computer 175 may exclude non-diverse terminals 120 from transmitting commands to switch to a second satellite link 145B.

As discussed above, the communication network 100 may include distributed control of switching terminals 120 to second satellite links 145B. For example, a computer 170 of each terminal 120 may determine whether to switch to a second satellite link 145B, to identify the second satellite link 145B, and to actuate the terminal 120 to switch to the second satellite link 145B. However, the terminal 120 may lack data specifying data throughput $d_i$ of other satellites 110A, 110B, average data throughput $d_{avg}$, link condition $lc_a$, $lc_b$, and/or other data necessary to make a determination whether to switch and/or switch to which satellite link 145B.

In one example, a terminal 120 may receive system data broadcast by, e.g., a central computer 175, including average data throughputs $d_{avg}$, data throughput $d_i$ of each satellite 110A, 110B, link conditions $lc_a$, $lc_b$ of each satellite 110A, 110B, etc. In one example, the terminal 120 computer 170 may be programmed to determine, based on the received broadcast data, a second satellite link 145B to a satellite 110B within the field of view of the terminal 120 dish with a minimum data throughput $d_t$, and to switch the terminal 120 to the identified second satellite link 145B. Additionally or alternatively, as discussed with reference to equations (1)-(4), the computer 170 may be programmed to identify the second satellite link 145B based on a combination of link condition $lc_a$, $IC_b$, data throughput $d_{avg}$, etc. Thus, a terminal 120, e.g., including a simple phased array antenna 135, may monitor the load (data throughput) of the other satellite(s) 110A, 110B without hopping between satellites 110A, 110B and losing communications with its current satellite link 145A.

A problem may arise in a distributed control communication network 100 in which a terminal 120 computer 170 switches to a second satellite link 145B based on broadcast data. Multiple terminals 120 may switch to a same second satellite link 145B based on the received broadcast data when they implement a same logic and receive same broadcast data. Instability may result in the communication network 100 from switching multiple terminals 120 to a same second satellite 110B. In one example solution, the computer 170 may be programmed to implement a filter for switching to a second satellite link 145B, e.g., by allowing for some random selection criteria and/or hysteresis in the thresholds for switching the satellite links 145A, 145B.

In another example, the terminal 120 may not receive broadcast data and may switch to a second satellite link 145B in a trial-and-error scheme. In the present context, "switching using a trial-and-error scheme" means the computer 170 switches to a second satellite link 145B of a same satellite 110A of the first satellite link 145A or a second satellite link 145B of a second satellite 110B without predicting whether the second satellite link 145B provides an improvement to, e.g., the link condition, the load balancing, etc. Thus, upon switching to the second satellite link 145B, the computer 170 may determine to switch back to the first satellite link 145A, to a third satellite link, etc. Therefore, switching to the second satellite link 145B without receiving broadcast data may result in unstable conditions including switching back and forth between satellite links 145A, 145B. As discussed below, an advanced phased array antenna 135 may help prevent such transitory and/or unstable conditions.

As discussed above, an advanced phased array antenna 135 may maintain multiple receive (or out-route) satellite links 145A, 145B simultaneously. Thus, the terminal 120 computer 170 may be programmed to, while maintaining the first satellite link 145A, activate a second satellite link 145B and to determine the data throughput $d_i$ of the satellite 110B of the second satellite link 145B, the link condition, etc. Thus, the computer 170 may determine the link condition, capacity of the satellite link 145B, etc., without losing the first satellite link 145A, and thereby prevent data loss, packet drop, etc., due to back-and-forth switching of satellite link.

Figure 2:
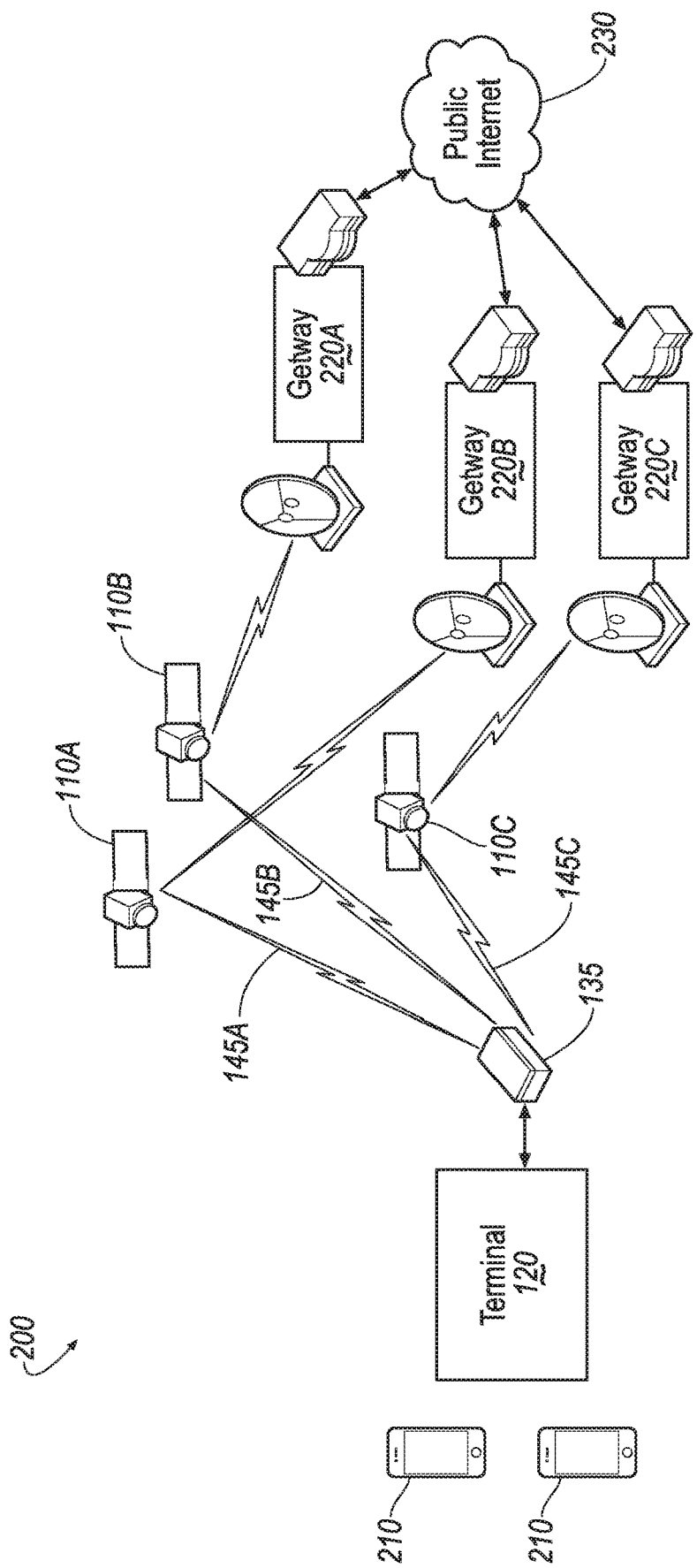
FIG. 2 is an example satellite network connected to a public network via gateways.

FIG. 2 shows an example system 200 to provide Internet access to devices 210, e.g., a mobile device, computer, TV, etc. A device 210 processor may be programmed to establish a connection to a remote computer accessible via a network 230 such as the public Internet 230. The devices 210 may communicate with the terminal 120 via a wired and/or wireless, e.g., WiFi®, communication interface. The terminal 120 may switch between satellite links 145A, 145B, 145C to multiple satellites 110A, 110B, 110C. The satellites 110A, 110B, 110C provide public network 230 access via gateways 220. The gateway 220 may be used to facilitate multiple communication protocols along a communication path. A gateway 220 typically includes one or more processors programmed to establish and maintain a data traffic session between a computer in the satellite network, e.g., a mobile device 210, and a computer outside the satellite network, e.g., a server computer in the public network 230.

The gateways 220A, 220B, 220C may be access points between the network 230 and the terrestrial network of satellites 110A, 110B, 110C. Thus, it will be understood that the gateways 220A, 220B, 220C can include programming for TCP (Transmission Control Protocol) acceleration and compression. After switching a satellite link 145A, 145B, 145C, a terminal 120 needs to be connected to a new gateway 220A, 220B, 220C. A terminal 120 may then operate with different IPv4 and/or IPv6 addresses; in this scenario, active sessions from a time prior to switching the links 145A, 145B, 145C may be lost. Thus, it may take time for route convergence using protocols such as BGP (Border Gateway Protocol) to establish a new data traffic session between the device 210 and the network 230 via the gateway 220B.

Figure 3:
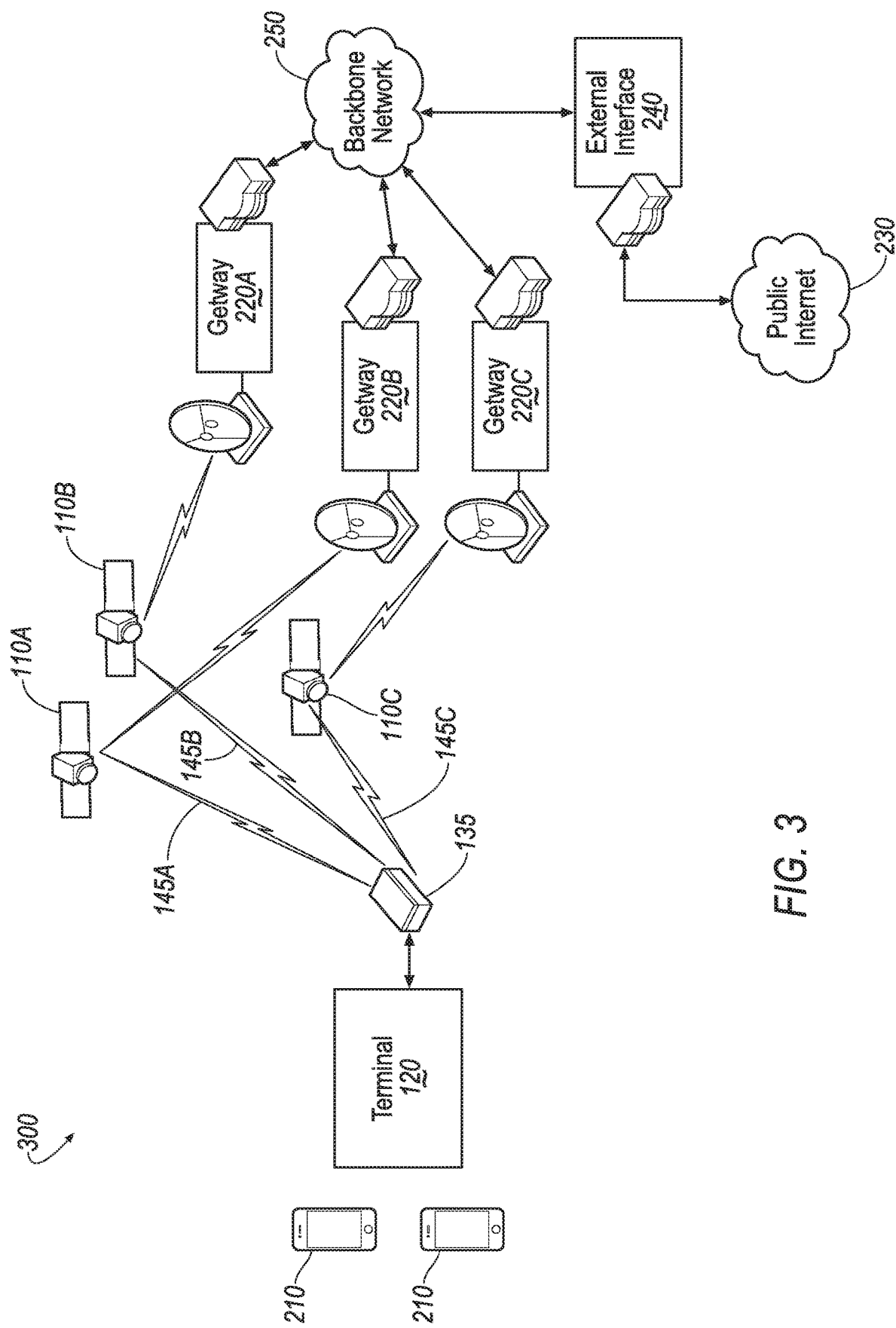
FIG. 3 is another example satellite network connected to the public network via a backbone network and an external interface.

FIG. 3 illustrates an example system 300 that addresses a loss of data traffic session(s) upon switching the satellite links 145A, 145B, 145C. In contrast to the example system 200 of FIG. 2, the example system 300 of FIG. 3 includes an external interface 240 and a backbone network 250. The gateways 220A, 220B, 220C may communicate with the public network 230 via the backbone network 250 and the external interface 240. Thus, the data traffic flows of satellite links 145A, 145B, 145C may be routed through the external interface 240 for processing and for relay to and from the public network 230 or enterprise intranets. In the present context, the external interface 240 is a centralized gateway with a common IP processing, common packet header and/or payload compression, which keeps existing data traffic sessions intact upon switching satellite links 145A, 145B, 145C. In this scenario, the data traffic flows from various satellites 110A, 110B, 110C are routed through the external interface 240 for processing and for relay to and from the public Internet 230 or enterprise intranets. In the present context, the backbone network 250 includes computers and/or communication networks (wired and/or wireless) that connect the gateways 220A, 220B, 220C to the external interface 240.

Switching satellite links 145A, 145B, 145C in the system 300 may be referred to as "hitless." In the present context, "hitless" means (i) for TCP communication, any lost packets may be recovered by end-to-end TCP protocols or TCP acceleration protocols, (ii) for UDP (User Datagram Protocol) communication a suspended traffic flow (e.g., incoming packets queued) prior to switching satellite links 145A, 145B, 145C, may be resumed after completion of switching the links 145A, 145B, 145C.

Timing of data traffic may be adjusted upon switching a terminal 120 from, e.g., a first satellite link 145A to a second satellite link 145B. If transmission to multiple satellites 110A, 11B, 110C is time and frame synchronized, then terminals 120 after a switching may need less time for synchronization, i.e., might be able to start traffic while fine-tuning, rather than delaying traffic for gross timing acquisition and synchronization. Additionally or alternatively, to accelerate the synchronization process, each satellite 110A, 110B, 110C may broadcast to terminals 120 the location of other overlap satellites 110A, 110B, 110C and their propagation times to applicable gateways 220A, 220B, 220C (if there are multiple Gateways location, then for each gateway such need to be advertised), so that the terminal 120 can calculate its own propagation delay to each of the other satellites 110A, 110B, 110C for timing synchronization. In one example, each terminal 120 may cyclically determine propagation delay to each of the other satellites 110A, 110B, 110C, so as to be ready when it is necessary to switch of links 145A, 145B, 145C. Otherwise, upon switching a satellite link 145A, 145B, 145C, a terminal 120 may go through a synchronization process using conventional ALOHA (Additive Links On-line Hawaii Area) technique.

A power of transmitted radio magnetic signals from a terminal 120 may need to be adjusted upon switching from a first satellite link 145A to a second satellite link 145B, e.g., because of different distances to the satellites 110A, 110B, different type of satellites 110A, 110B, etc. In one example, at a time of installation of a terminal 120, a power adjustment factor for each of the satellites 110, 110B, 110C to which the terminal 120 may communicate, may be stored in a terminal 120 memory. Thus, upon switching the terminal 120 from a first satellite link 145A to a second satellite link 145B, the computer 170 may be programmed to adjust the terminal 120 output power based at least in part on the stored power adjustment factor. Additionally, the computer 170 may be programmed to adjust the output power based on other parameters such as a weather condition, etc.

Figure 4:
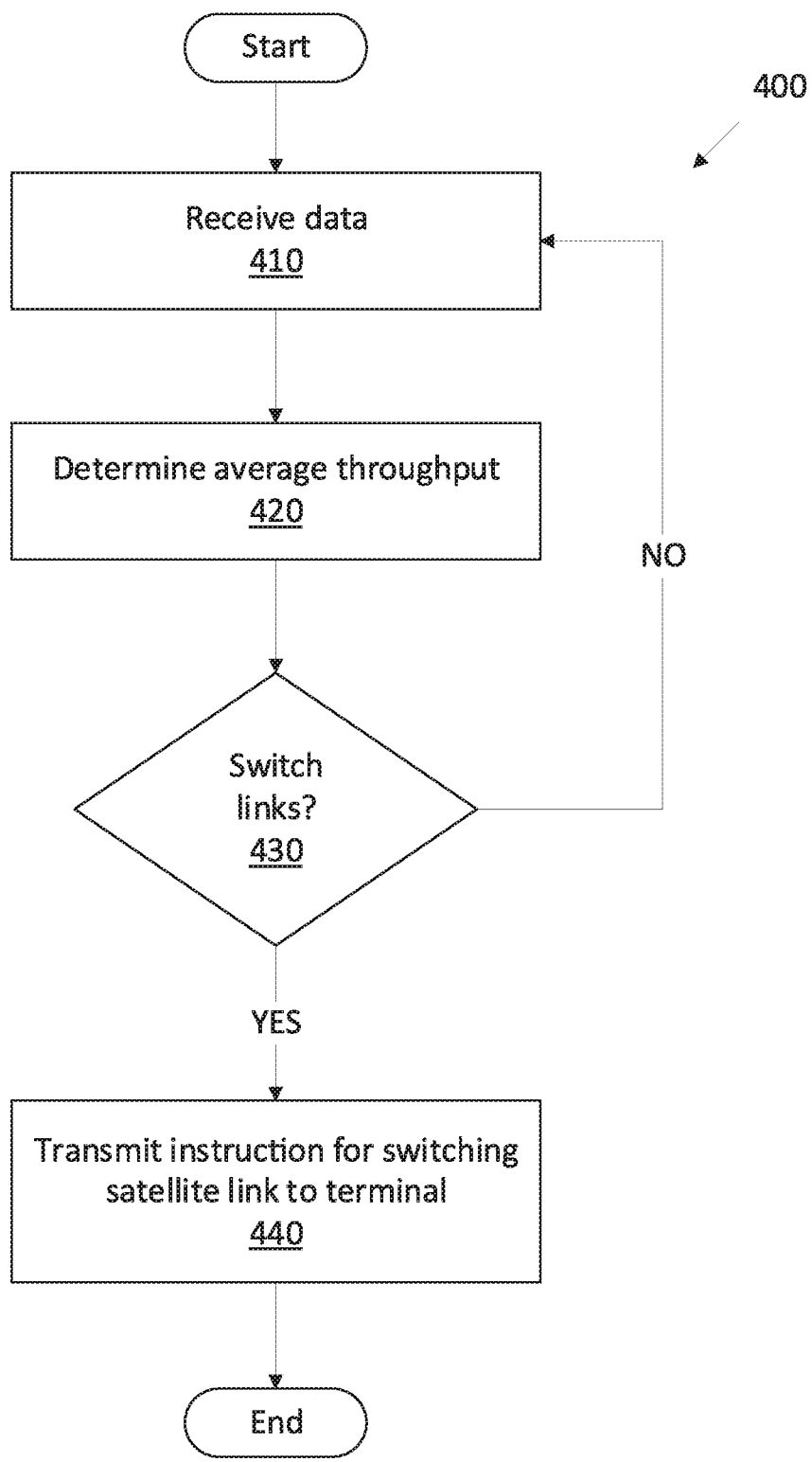
FIG. 4 is a flowchart of an example process for centrally controlling switching satellite links to balance load between satellites.

FIG. 4 shows an example process 400 for centrally controlling of terminal 120 switching between satellite links 145A, 145B. A remote computer 175 may be programmed to execute blocks of the process 400.

The process 400 begins in a block 410, in which the computer 175 receives: (i) satellite(s) 110A, 110B data including respective satellite 110 identifier(s), data throughput $d_t$, coverage area 140A, 140B on Earth, links 145A, 145B data such as frequency, polarization, symbol rate, etc., and/or link conditions $lc_a$, $lc_b$, and (ii) terminal 120 data including an identifier, location coordinates, direction of terminal 120 dish 130, type of terminal 120 (e.g., semi-diverse, fully-diverse, non-diverse), data throughput $d_a$, $d_b$, type of antenna 135 (e.g., simple phased array or advanced phased array), etc.

Next, in a block 420, the computer 175 determines an average data throughput $d_{avg}$ of satellites 110A, 110B. In one example, the computer 175 may be programmed, e.g., based on an equation (2), to determine an average data throughput $d_{avg}$ of satellites 110A, 110B.

Next, in a decision block 430, the computer 175 determines whether switching a satellite link 145A, 145B of a terminal 120 is warranted. The computer 175 may be programmed, e.g., based on equation (4), to identify a terminal 120 for switching the satellite link 145A, 145B, upon determining that the switching quantifier Q exceeds a threshold Qth. If the computer 175 identifies a satellite link 145A of a terminal 120 for switching to a second satellite link 145B, then the process 400 proceeds to a block 440; otherwise the process 400 ends, or alternatively, returns to the block 410, although not shown in FIG. 4.

Figure 5:
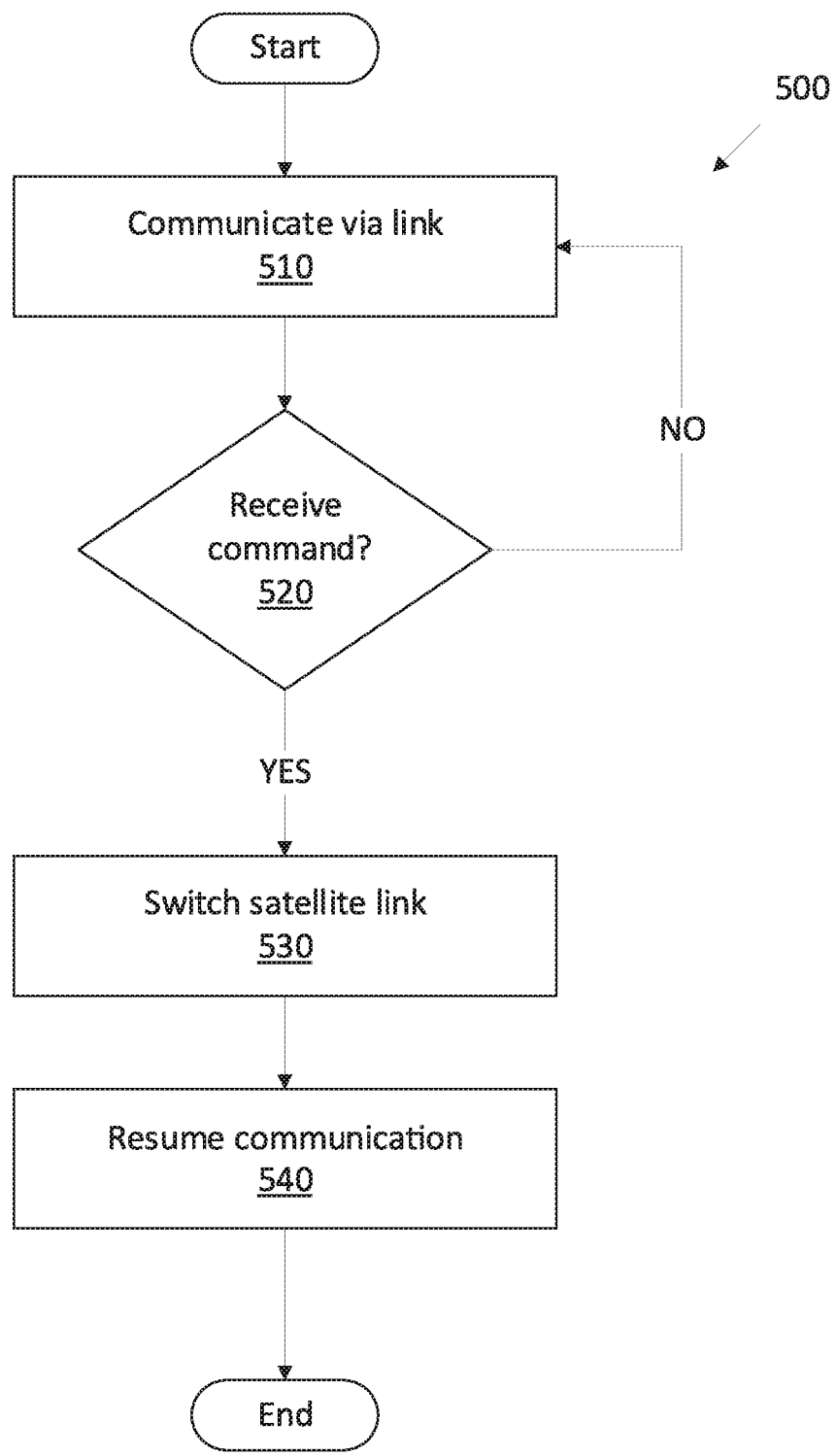
FIG. 5 is a flowchart of an example process for a terminal being centrally controlled to switch a first satellite link to a second satellite link.

FIG. 5 shows an example process 500 for terminals 120 that are centrally controlled to switch between satellite links 145A, 145B. A terminal 120 computer 170 may be programmed to execute blocks of the process 500.

The process 500 begins in a block 510, in which the computer 170 communicates via a first satellite link 145A with a satellite 110A. For example, the computer 170 may be programmed to start communication with via a first satellite link 145A upon activating the terminal 120, e.g., based on stored default setting stored in a terminal 120 memory. The computer 170 may be programmed to send and/or receive data via the satellite link 145A, e.g., to provide internet access for a mobile device 210 connected via a wired and/or wireless network, e.g., WiFi®, to the terminal 120.

Next, in a decision block 520, the computer 170 determines whether a command to switch the first satellite link 145A to a second satellite link 145B is received. The computer 170 may be programmed to determine that the command to switch to the satellite link 145A is received upon identifying the terminal 120 identifier in the received command data. If the computer 170 determines that the command to switch the satellite link 145A is received, then the process 500 proceeds to a block 530; otherwise the process 500 returns to the block 510.

In the block 530, the computer 170 switches the first satellite link 145A to the second satellite link 145B based on the received command. The computer 170 may be programmed to switch to the second satellite link 145B based on the second satellite link 145B data included in the received command, e.g., frequency, polarization, satellite identifier, etc.

Next, in a block 540, the computer 170 resumes communication via the second satellite link 145B. For example, the computer 170 may be programmed to adjust timing of communication, update IP addresses for data traffic session, etc., as discussed with respect to FIGS. 2 and 3. Following the block 540, the process 500 ends, or alternatively returns to the block 510, although not shown in FIG. 5.

Figure 6A:
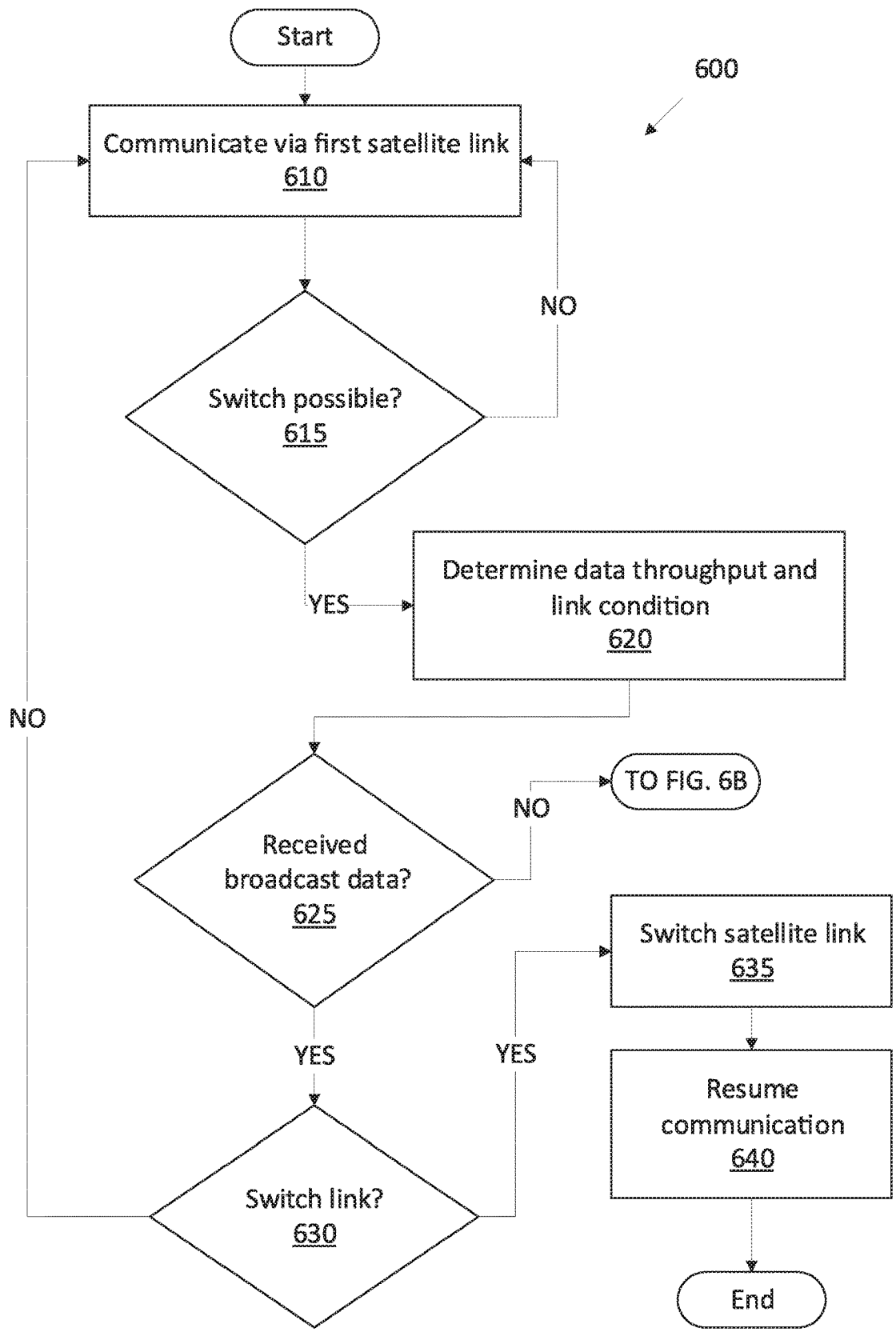
FIG. 6A-6B are a flowchart of an example process for a distributed control of switching from a first satellite link to a second satellite link.
Figure 6B:
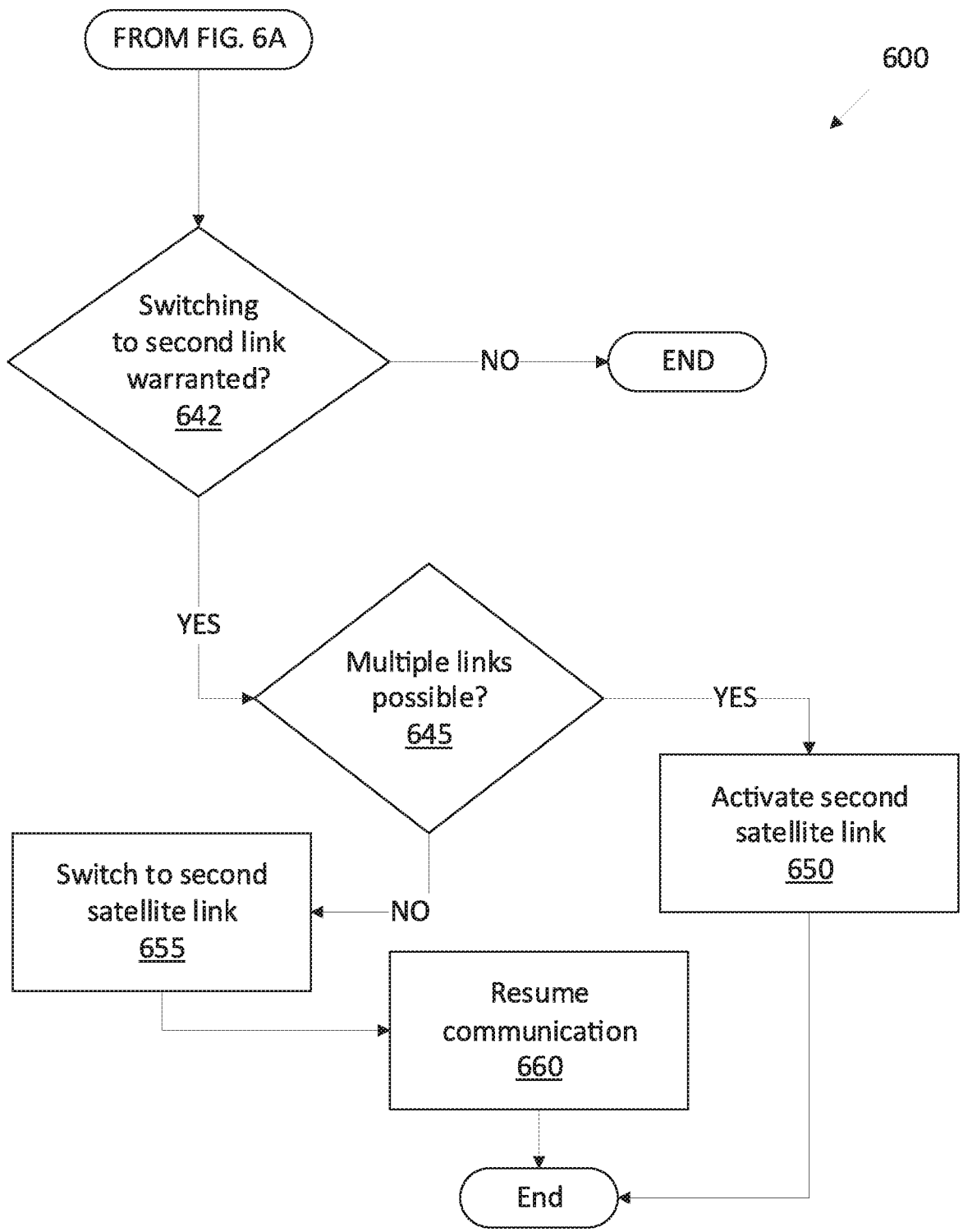

FIG. 6A-6B show an example process 600 for a distributed controlled terminal switching between satellite links 145A, 145B. For example, a terminal 120 computer 170 may be programmed to execute blocks of the process 600.

With reference to FIG. 6A, the process 600 begins in a block 610, in which the computer 170 communicates via a first satellite link 145A, e.g., based on data stored in a terminal 120 memory including a default setting of the terminal 120.

Next, in a decision block 615, the computer 170 determines whether switching to a second satellite link 145B is technically possible based on a type of terminal 120, e.g., semi-diverse, fully-diverse, or non-diverse. If the computer 170 determines that switching the satellite link 145A is possible, then the process 600 proceeds to a block 620; otherwise the process 600 returns to the block 610.

In the block 620, the computer 170 determines a data throughput $d_a$, satellite data throughput $d_t$, etc. The computer 170 may be programmed to determine satellite data throughput $d_t$ based on data received from the satellite 110A that is communicating with the terminal 120 via the satellite link 145A. The computer 170 may be programmed to determine the terminal 120 normalized data throughput $d_a$ based on volume of data sending and/or receiving via the satellite link 145A.

Next, in a decision block 625, the computer 170 determines whether broadcast data is received, e.g., from the satellite 110A, including identifier, coverage area 140A, 140B, beam identifier, data throughput $d_t$, average data throughput $d_{avg}$, etc. If the computer 170 receives broadcast data, then the process 600 proceeds to a decision block 630; otherwise the process 600 proceeds to a decision block 642 (see FIG. 6B).

In the decision block 630, the computer 170 determines whether a switching to a second satellite link 145B is warranted. The computer 170 may be programmed, based on equation (3), to determine based on the received broadcast data, e.g., satellites 110A, 110B coverage areas 140A,140B, overlap 150, etc., the normalized data throughput $d_a$ of the terminal 120, and/or the location of the terminal 120 relative to the overlap 150, etc., whether to switch to a second satellite link 145B. If the computer 170 determines that switching the terminal 120 to a second satellite link 145B is warranted, then the process 600 proceeds to a block 635; otherwise the process 600 returns to the block 610.

In the block 635, the computer 170 switches from the first satellite link 145A to a second satellite link 145B. Upon determining that the terminal 120 includes an advanced phased array antenna 135, the computer 170 may be programmed to switch to the second satellite link 145B by activating the second satellite link 145B while maintaining the first satellite link 145A. Upon determining that the terminal 120 cannot maintain simultaneous satellite links 145A, 145B, e.g., it has only a simple phased array antenna 135, the computer 170 deactivates the first satellite link 145A and activates the second satellite link 145B.

Next, in a block 640, the computer 170 resumes communication after switching the satellite link 145A, 145B. This block 640 may be omitted in case of adding the second satellite link 145B, because the data traffic session may not be interrupted upon maintaining the first satellite link 145A while adding the second satellite link 145B. Following the block 635, the process 600 ends, or alternatively returns to the block 610.

Turning to FIG. 6B, in the decision block 642, the computer 170 determines whether a switching to a second satellite link 145B is warranted. The computer 170 may be programmed to determine that switching to a second satellite link 145B is warranted upon determining that a data throughput $d_t$ of the satellite 110A exceeds a threshold, e.g., 80%. The computer 170 may be programmed to receive the data throughput $d_t$ from the satellite 110A computer 115. If the computer 170 determines that switching to a second satellite link 145B is warranted, then the process 600 proceeds to a decision block 645; otherwise the process 600 ends, or alternatively returns to the block 610, although not shown in FIGS. 6A-6B.

In the decision block 645, the computer 170 determines whether the terminal 120 antenna 135 can communicate simultaneously via multiple satellite links 145A, 145B. For example, the computer 170 may be programmed to determine that the terminal 120 can communicate via multiple links 145A, 145B upon determining that the terminal 120 includes an advanced phased array antenna 135. If the computer 170 determines that the terminal 120 may communicate simultaneously via multiple links 145A, 145B, then the process 600 proceeds to a block 650; otherwise the process 600 proceeds to a block 655.

In the block 650, the computer 170 activates the second satellite link 145B while maintaining communication via the first satellite link 145A. Thus, the communication may not be interrupted. Additionally, the computer 170 may be programmed to deactivate the first satellite link 145A upon establishing communication via the second satellite link 145B, or alternatively may continue to communicate via multiple satellite links 145A, 145B. Following the block 650, the process 600 ends, or alternatively returns to the block 610, although not shown in the FIGS. 6A-6B.

In the block 655, the computer 170 switches to the second satellite link 145B and deactivates the first satellite link 145A.

Next, in a block 660, the computer 170 resumes the communication via the satellite link 145B. The computer 170 may be programmed to adjust timing, update IP addresses, etc., as discussed with reference to FIGS. 2 and 3, to resume the communication which may have been interrupted due to switching from the first satellite link 145A to the second satellite link 145B.

Following the block 660, the process 600 ends, or alternatively returns to the block 610, although not shown in FIG. 6A-6B.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system comprising:
   a computer, programmed to:
   receive broadcast data including an average data throughput that is an average of data throughputs of a plurality of satellites that are within a field of view of an antenna, the plurality of satellites including a first satellite and a second satellite, wherein a first link exists between a terminal and the first satellite;
   determine a second satellite link between the terminal and one of the plurality of satellites based on the received broadcast data and a data throughput of the first satellite; and
   actuate to switch, from the first satellite link between the terminal and the first satellite, to the second satellite link upon determining that a difference between the data throughput of the first satellite and a first satellite throughput capacity exceeds a data throughput threshold.

2. The system of claim 1, wherein the second satellite link is between the terminal and a second satellite.

3. The system of claim 1, wherein the computer is further programmed to determine the second satellite link based at least on one of a coverage area, a link condition, and a jitter, of the second satellite link.

4. The system of claim 3, wherein the computer is further programmed to determine the second satellite link further based in part on the average of the data throughputs of the plurality of satellites.

5. The system of claim 1, wherein the data throughput of the first satellite includes a data type quantifier and the data throughput threshold includes a data type quantifier threshold, and the computer is further programmed to switch to the second satellite link only upon determining that the data type quantifier of data being communicated via the first satellite link exceeds the data type quantifier threshold.

6. The system of claim 1, wherein the system further includes an advanced phased array antenna and the computer is further programmed to activate the second satellite link while maintaining a communication via the first satellite link upon determining that the data throughput of the first satellite exceeds a threshold.

7. The system of claim 1, further comprising a remote computer, programmed to select the second satellite link for the terminal and actuate the terminal to switch to the second satellite link.

8. The system of claim 7, wherein the remote computer is further programmed to:
   receive a location and a data throughput of the terminal;
   identify overlapping satellites in the plurality of satellites with an area of overlap including the location of the terminal;
   determine respective data throughputs of each of the overlapping satellites;
   determine an average of the respective data throughputs of the overlapping satellites; and
   determine the second satellite link based at least in part on the data throughputs of each of the overlapping satellites, the average data throughput of the overlapping satellites, and the data throughput of the terminal.

9. The system of claim 7, wherein the remote computer is further programmed to transmit a command to the terminal to switch to the second satellite link, and the computer is further programmed to switch to the second satellite link upon receiving the command from the remote computer.

10. The system of claim 1, wherein the first and second satellite links are to a same satellite and differ in at least one of a spot beam, a polarization, a symbol rate, and a frequency.

11. A method, comprising:
receiving, from a remote computer, broadcast data including an average data throughput that is an average of data throughputs of a plurality of satellites that are within a field of view of an antenna, the plurality of satellites including a first satellite and a second satellite, wherein a first link exists between a terminal and the first satellite;
determining a second satellite link between the terminal and one of the plurality of satellites based on the received broadcast data and a data throughput of the first satellite; and
actuating to switch, from the first satellite link between the terminal and the first satellite, to the second satellite link upon determining that a difference between the data throughput of the first satellite and a first satellite throughput capacity exceeds a data throughput threshold.

12. The method of claim 11, wherein the second satellite link is between the terminal and a second satellite.

13. The method of claim 11, further comprising determining the second satellite link further based in part on the average of the data throughputs of the plurality of satellites.

14. The method of claim 13, further comprising determining the second satellite link based in part on the average data throughput of the plurality of satellites.

15. The method of claim 11, further comprising switching to the second satellite link upon determining that a data type quantifier of data being communicated via the first satellite link is beyond a data type quantifier threshold, wherein the data throughput of the first satellite includes the data type quantifier and the data throughput threshold includes the data type quantifier threshold.

16. The method of claim 11, further comprising activating, in an advanced phased array antenna, the second satellite link while maintaining a communication via the first satellite link upon determining that the data throughput of the first satellite exceeds a threshold.

17. The method of claim 11, further comprising selecting, in a remote computer, the second satellite link for the terminal and actuating the terminal to switch to the second satellite link.

18. The method of claim 17, further comprising:
receiving a location and a data throughput of the terminal;
identifying overlapping satellites in the plurality of satellites with an area of overlap including the location of the terminal;
determining respective data throughputs of each of the overlapping satellites;
determining an average of the respective data throughputs of the overlapping satellites; and
determining the second satellite link based at least in part on the data throughputs of each of the overlapping satellites, the average data throughput of the overlapping satellites, and the data throughput of the terminal.

* * * * *